Inventor
Andrew Moser

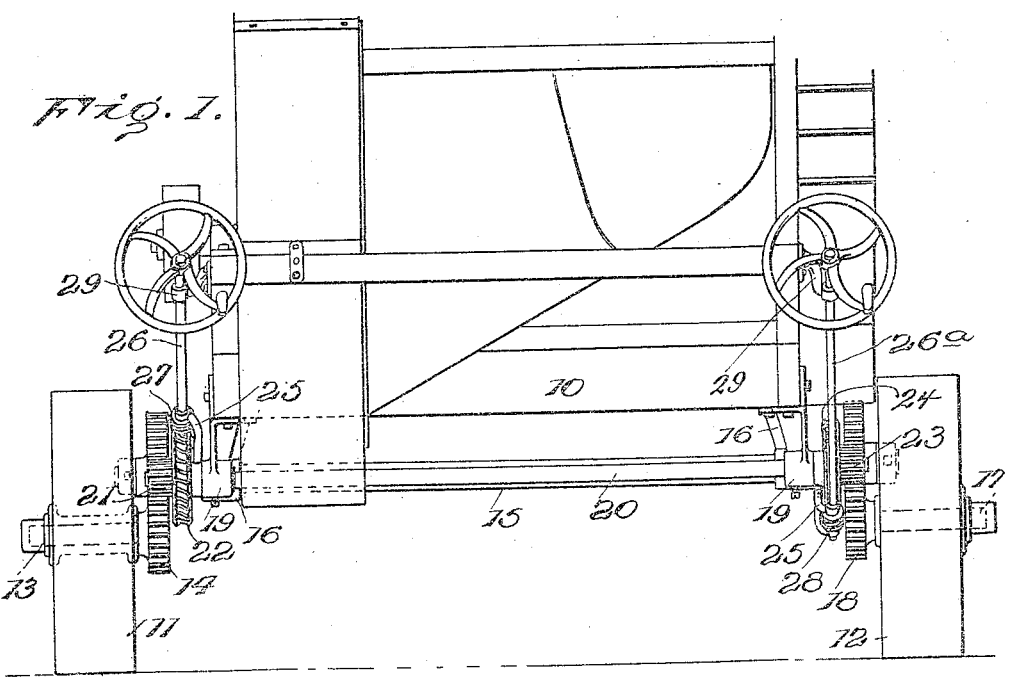

UNITED STATES PATENT OFFICE.

ANDREW MOSER, OF HICKMAN, NEBRASKA.

LEVELING DEVICE.

1,259,547.
Specification of Letters Patent.
Patented Mar. 19, 1918.

Application filed May 7, 1917. Serial No. 167,053.

*To all whom it may concern:*

Be it known that I, ANDREW MOSER, a citizen of the United States, residing at Hickman, in the county of Lancaster and State of Nebraska, have invented new and useful Improvements in Leveling Devices, of which the following is a specification.

This invention relates to apparatus for leveling threshers and other wheeled structures in order that they may be maintained in a level position irrespective of the inclination of the hill on which they may be standing.

The invention has for its object to provide a simple, efficient and easily operated means for raising or lowering the body of the machine or other wheeled structure with respect to the wheels, as will be pointed out in the detailed description appearing hereinafter, and in order that the same may be better understood, reference is had to the accompanying drawing forming a part of this specification.

In the drawings:

Figure 1 is a rear elevation of a thresher showing the application of the invention;

Fig. 2 is a similar view showing the parts in another position;

Figure 3:
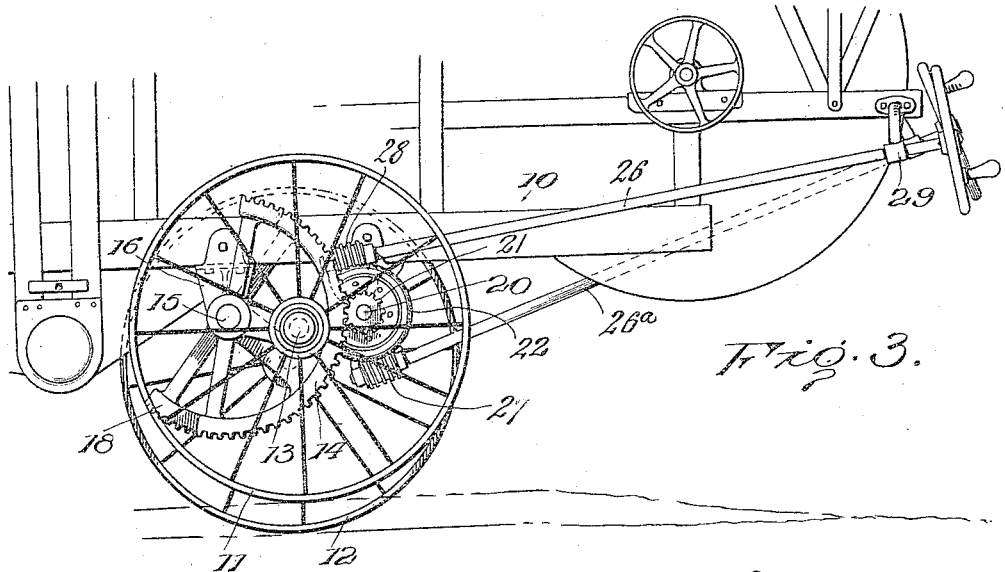
Fig. 3 is a side elevation showing the position of the parts as in Fig. 2.
Figure 4:
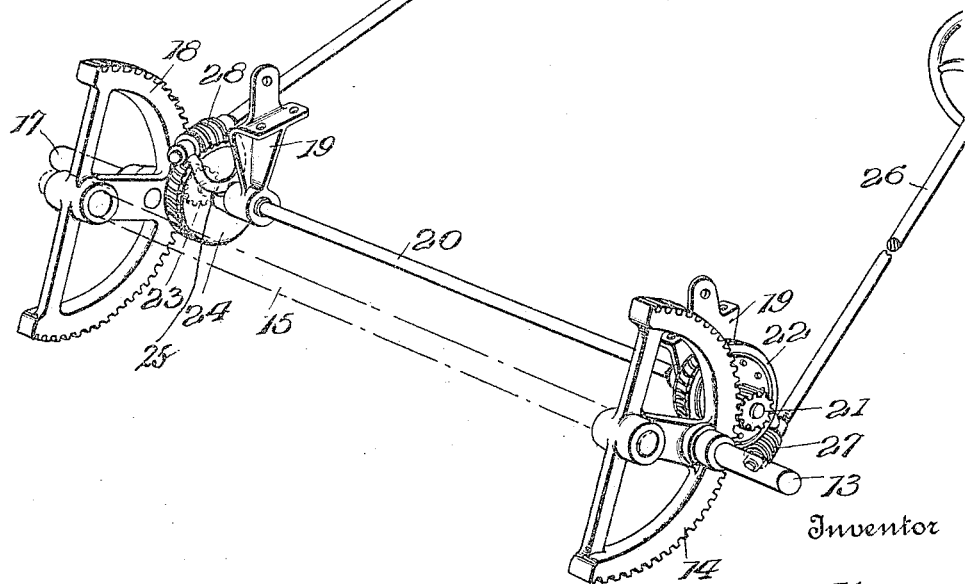
Fig. 4 is a detail in perspective.

Referring specifically to the drawing, 10 denotes the body of the machine supported on wheels 11 and 12 respectively. The wheel 11 is journaled on a stub axle 13 carried by a sector gear 14 which is mounted at its hub portion on a shaft 15 to swing in a vertical plane, said shaft extending across the bottom of the body 10 and being supported by brackets 16 on the latter. The wheel 12 is also journaled on a stub axle 17 carried by a sector gear 18 supported on the shaft 15. The axles of the two wheels are off the center or pivotal axes of the gear sectors, whence it will be seen that when the sectors are swung, the elevation of the body 10 relatively to the wheels will be varied, and by operating one or the other sector gears, the body can be kept perfectly level when the machine is standing on a hillside or on uneven ground. The sector gears are operable independently for the purpose stated by the following means:

On the bottom of the body 10 are brackets 19 which support a shaft 20. On this shaft is loosely or rotatably mounted a pinion 21 having on one side a worm wheel 22. The pinion 21 is in mesh with the teeth of the gear sector 14. The shaft 20 also supports a second pinion 23 meshing with the gear sector 18 and being also provided with a worm wheel 24. The respective pinions are independently rotatable, so that either one of the sector gears may be swung without affecting the other one of said gears. The shaft 20 carries bearing arms 25 in which are supported shafts 26 and 26ª, respectively provided with a hand wheel or other suitable actuating means at their outer ends. At its inner end, the shaft 26 is adjacent to the worm wheel 22 and has a worm 27 in mesh therewith. The shaft 26ª has a worm 28 in mesh with the worm wheel 24. Thus it will be seen that when one of the worm shafts is turned, one of the sector gears is swung, and the other sector gear is swung when the other worm shaft is turned. The outer ends of the worm shafts are supported by bearing brackets 29 on the body 10.

The device is simple in construction, and easily operated, and it can be readily applied to existing machines without alterations in the structure thereof, except to remove the usual wheels and substitute therefor the wheel structure and its associate parts hereinbefore described. The worm gearing employed locks the wheels in any position they may be placed.

I claim.

A leveling device for a wheeled apparatus, comprising wheel supporting members located on opposite sides of the apparatus, a transverse shaft on which said members are journaled to swing in a vertical plane, the wheels being supported outward of the axis of said members, each of said members having a gear portion, pinions in mesh with the gear portions of the respective members, a support on which the pinions are mounted for independent rotation, a worm wheel on each pinion, worms in mesh with the respective worm wheels, and actuating means for the worms.

In testimony whereof I affix my signature.

ANDREW MOSER.